US009938869B2

(12) United States Patent
Dwivedi et al.

(10) Patent No.: US 9,938,869 B2
(45) Date of Patent: Apr. 10, 2018

(54) INTERNAL CHARGE AIR FEED FROM ROCKER COVER INTEGRATED INTAKE RUNNERS

(71) Applicant: Ford Global Technologies, LLC, Dearborn, MI (US)

(72) Inventors: Rishi Dwivedi, Novi, MI (US); Christopher William Newman, Farmington Hills, MI (US); Roy Allen Ford, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 14/730,787

(22) Filed: Jun. 4, 2015

(65) Prior Publication Data

US 2016/0356190 A1 Dec. 8, 2016

(51) Int. Cl.
*F01M 13/04* (2006.01)
*F16N 13/00* (2006.01)

(52) U.S. Cl.
CPC ..... *F01M 13/04* (2013.01); *F01M 2013/0488* (2013.01); *F16N 2013/006* (2013.01)

(58) Field of Classification Search
CPC .............................. F01M 13/0416; F02F 7/00
USPC ...................... 123/572–574, 41.86
See application file for complete search history.

(56) References Cited

U.S. PATENT DOCUMENTS

| 4,156,406 | A | * | 5/1979 | Brandau | B01D 45/08 123/41.86 |
| 4,597,372 | A | * | 7/1986 | Furukawa | F01M 11/00 123/572 |
| 4,920,930 | A | * | 5/1990 | Sakano | F01M 13/04 123/41.86 |
| 5,058,542 | A | * | 10/1991 | Grayson | F01M 13/0011 123/193.5 |
| 5,129,371 | A | * | 7/1992 | Rosalik, Jr. | F01M 13/0416 123/41.86 |
| 5,617,834 | A | * | 4/1997 | Lohr | F02B 75/22 123/572 |
| 5,957,118 | A | * | 9/1999 | Tateno | F01M 13/04 123/573 |
| 6,412,478 | B1 | * | 7/2002 | Ruehlow | F01M 13/0416 123/41.86 |
| 6,418,916 | B1 | * | 7/2002 | Newmann | F01M 13/02 123/559.1 |
| 7,699,029 | B2 | | 4/2010 | Herman et al. | |

(Continued)

*Primary Examiner* — Marguerite McMahon
(74) *Attorney, Agent, or Firm* — LeClairRyan

(57) ABSTRACT

A high pressure charge air feed arrangement for an internal combustion engine is provided. The arrangement includes an intake having a high pressure output, a rocker cover having an intake runner defining a high pressure charge flow path, and a gas and oil separator having a flow accelerator with input and output sides. The high pressure output of the intake is attached to one end of the path and the accelerator is attached to the other end. The path is connected between the input and output sides of the accelerator. The separator includes upper and lower plenums divided by a wall having an oil and gas diffuser. The input side is connected to the lower plenum and the output side is connected to a crankcase oil return line. The flow accelerator may be any type of fluid accelerator, including, but not limited to, a venturi pump and a jet pump.

8 Claims, 4 Drawing Sheets

(56) References Cited

U.S. PATENT DOCUMENTS

| | | | |
|---|---|---|---|
| 8,151,778 B2* | 4/2012 | Lewis | F01M 13/02 |
| | | | 123/572 |
| 2009/0025662 A1 | 1/2009 | Herman et al. | |
| 2009/0229585 A1* | 9/2009 | Tanaka | F01M 13/04 |
| | | | 123/573 |
| 2009/0308364 A1* | 12/2009 | Konohara | F01M 13/022 |
| | | | 123/572 |
| 2010/0043734 A1 | 2/2010 | Holzmann et al. | |
| 2011/0073082 A1* | 3/2011 | Hattori | F01M 13/022 |
| | | | 123/574 |

* cited by examiner

INTERNAL CHARGE AIR FEED FROM ROCKER COVER INTEGRATED INTAKE RUNNERS

TECHNICAL FIELD

The disclosed inventive concept relates to engine emission control systems, and, in particular, the disclosed inventive concept relates to closed crankcase ventilation arrangements for internal combustion engines. More particularly, the disclosed inventive concept relates to a system for an internal combustion engine having an intake and rocker cover with an associated closed crankcase ventilation oil separator assembly that increases oil flow velocity by relying on an internal charge air feed passing from the intake and through intake runners integrated in the rocker cover.

BACKGROUND OF THE INVENTION

During the combustion stage of the air-fuel mixture within an internal combustion engine, exhaust gases are created that exit the engine via the exhaust manifold. However, not all gases exit the engine at this time. Some of these gases are forced to bypass the piston and enter the crankcase because of the pressure created during combustion of the air-fuel mixture.

Relief of these collected gases is necessary to avoid damage to engine gaskets caused by the extra crankcase pressure. Such damage results in oil leakage. An early and direct solution to the build-up of exhaust gases in they crankcase was simply to exhaust the collected gases directly to the atmosphere via, for example, a road draft tube. However, this is an undesirable solution to the presence of these gases due to the negative environmental impact generated by these unburned hydrocarbon emissions.

As an alternative, these gases can be re-introduced into the engine by evacuating them from the crankcase and adding them to the air-fuel mixture entering the engine via the intake manifold. Oil separators are known for this purpose.

A common solution to separating oil from water includes the use of a mesh filter in which oil droplets are trapped in the mesh (typically composed of a microfiber) and air is allowed to pass through. Another simple approach to separating oil from air is to provide a tube through which passes the recycled gas. The tube has holes formed on its side. Air passes through the holes and oil droplets, being heavier, fall to the bottom of a reservoir. A moving unit, such as a centrifuge, may also be used to separate oil from the air. The separated oil is directed back into the crankcase.

A very typical solution has been to have the crankcase gases flow from the crankcase to the intake manifold by way of a positive crankcase ventilation ("PCV") system as regulated by a valve located along the PCV path. According to one PCV example, the path for the PCV begins at the valve cover and ends at the intake manifold. During engine operation, the PCV valve increases a restriction between the intake system and the crankcase in periods of higher intake manifold vacuum, thus reducing the restriction between the intake manifold and the crankcase during periods of lower intake manifold vacuum. According to this system, a slight vacuum is maintained in the engine crankcase thereby drawing hydrocarbons from the engine crankcase and directing them into the engine intake system.

Some known systems rely on a PCV valve typically fitted to the valve cover. An external PCV hose is fitted between the air/oil separator and the intake manifold. Hose connections may also include a hose connection on the cam cover and one on the intake manifold. Joints are required for each connection. While providing an environmentally sound method of relieving the collected gases, the reliance on rubber hoses introduces potential failure of the system due to aging of the hoses or leakage caused by accidental disconnection of the hose from the valve.

To avoid the need for hose connections, it is possible to bolt the oil separator to the rocker cover for gravity-induced drainage. However, in such an arrangement, separated oil does not drain due to a high delta pressure between the drain outlet and the crankcase pressure on the other side of the rocker cover.

Accordingly, as in so many areas of vehicle technology there is room for improvement related to the use and operation of oil separation systems associated with the internal combustion engine.

SUMMARY OF THE INVENTION

To avoid the problems associated with the prior art, the disclosed inventive concept provides an internal charge air feed to a unidirectional oil separator having an oil flow accelerator (such as a with venturi pump or a jet pump) from intake runners integrated into the rocker cover without the use of any external plumbing or hose. The oil flow accelerator introduces a high pressure charge air feed into the oil flow accelerator that forces the oil from the oil separator outlet to the engine crankcase. Since the rocker cover has integrated intake runners, the required charge air feed can also be integrated into the rocker cover, thus avoiding the need for external pipes.

More particularly, the disclosed inventive concept provides a high pressure charge air feed arrangement for an internal combustion engine that includes a rocker cover having a high pressure charge flow path and an intake fluidly connected to the path for introducing high pressure air into the path. The flow path in the rocker cover is an intake runner. Further provided is a gas and oil separator having a flow accelerator. The path is fluidly attached to the accelerator.

The flow accelerator has an oil input side and an oil output side. The high pressure charge flow path is connected between the oil input side and the oil output side of the accelerator. The output side of the flow accelerator is a high velocity side.

The gas and oil separator includes an upper plenum and a lower plenum. The upper plenum and the lower plenum are divided by a wall. An oil and gas diffuser is provided in the wall. The oil input side of the accelerator is fluidly associated with the lower plenum, while the oil output side is fluidly associated with a crankcase oil return line.

The flow accelerator may be any type of fluid accelerator, including but not limited to a venturi pump and a jet pump. The flow accelerator draws the pooled oil gathered in the lower plenum following separation out of the gasses and directs the oil to the crankcase. The separated air is directed from the gas and oil separator to the intake for combustion.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
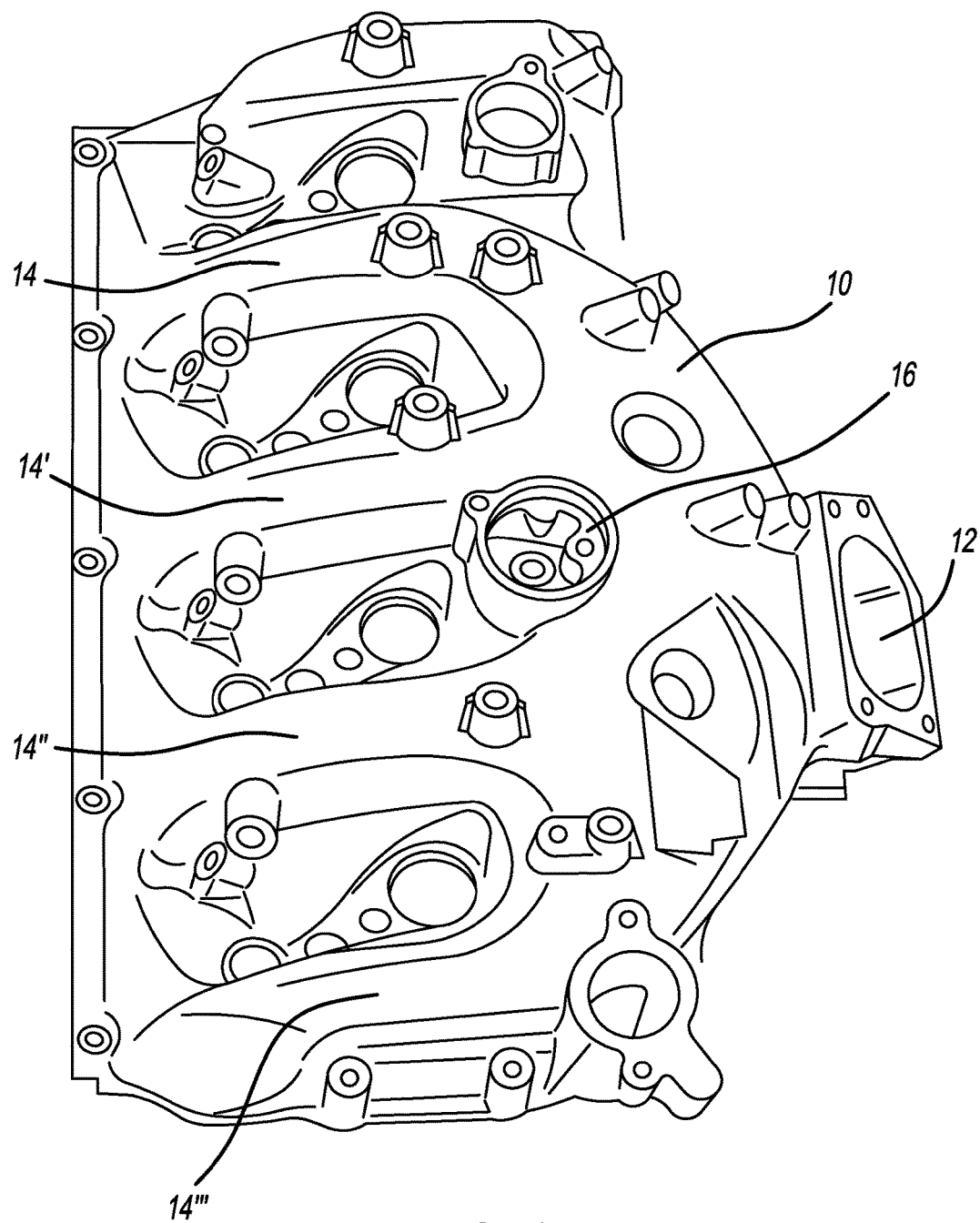
FIG. 1 is a perspective view of a rocker cover for an internal combustion engine for use with the air charge feed system according to the disclosed inventive concept.

In the following figures, the same reference numerals will be used to refer to the same components. In the following description, various operating parameters and components are described for different constructed embodiments. These specific parameters and components are included as examples and are not meant to be limiting.

In general, the disclosed invention is related to directing crankcase gases from the crankcase of an internal combustion engine and into the intake manifold for combustion through the use of internal charge air feed passing from the intake and through intake runners integrated in the rocker cover. The internal charge air enters into the oil flow accelerator located in the oil separator and induces a high velocity oil flow on its intake side. Separated oil is returned to the crankcase, while separated air is returned to the intake manifold for combustion.

Figure 2:
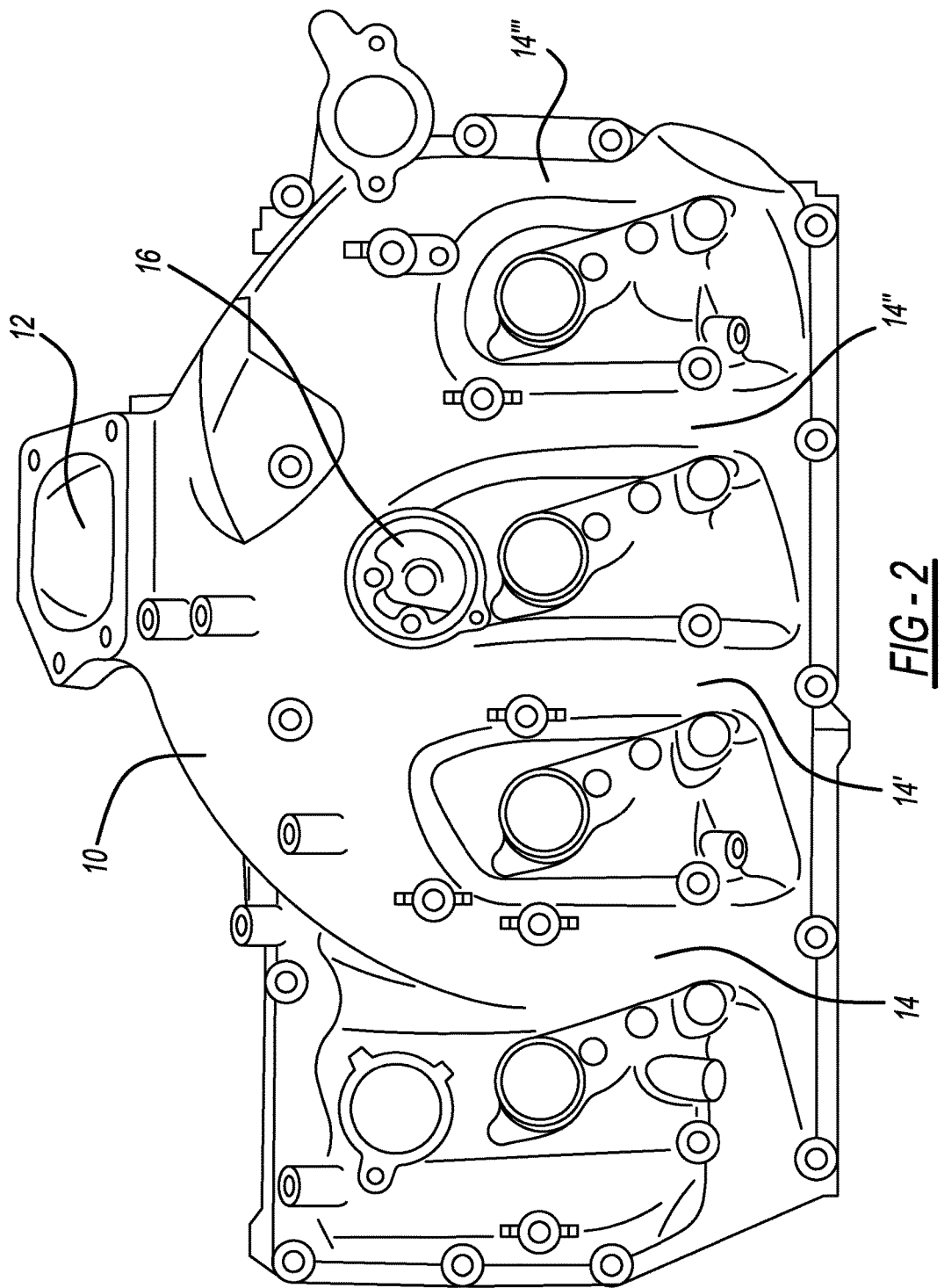
FIG. 2 is a top view of the rocker cover illustrated in FIG. 1 according to the disclosed inventive concept.

FIGS. 1 and 2 illustrates a rocker cover 10 for an internal combustion engine for use with the air charge feed system according to the disclosed inventive concept. FIG. 1 illustrates a perspective view of the rocker cover 10 while FIG. 2 illustrates a top view of the rocker cover. The rocker cover 10 illustrated in FIGS. 1 and 2 is suggestive and is not intended as being limiting as other configurations of the rocker cover 10 may be possible without deviating from the spirit and scope of the disclosed inventive concept.

The rocker cover 10 includes an intake port 12. The intake port 12 is fluidly attached to an intake assembly as will be described below with respect to FIG. 3. The rocker cover 10 includes a plurality of rocker cover intake runners 14, 14', 14", and 14'''. A greater or lesser number of intake runners can be provided other than the number illustrated herein.

Figure 3:
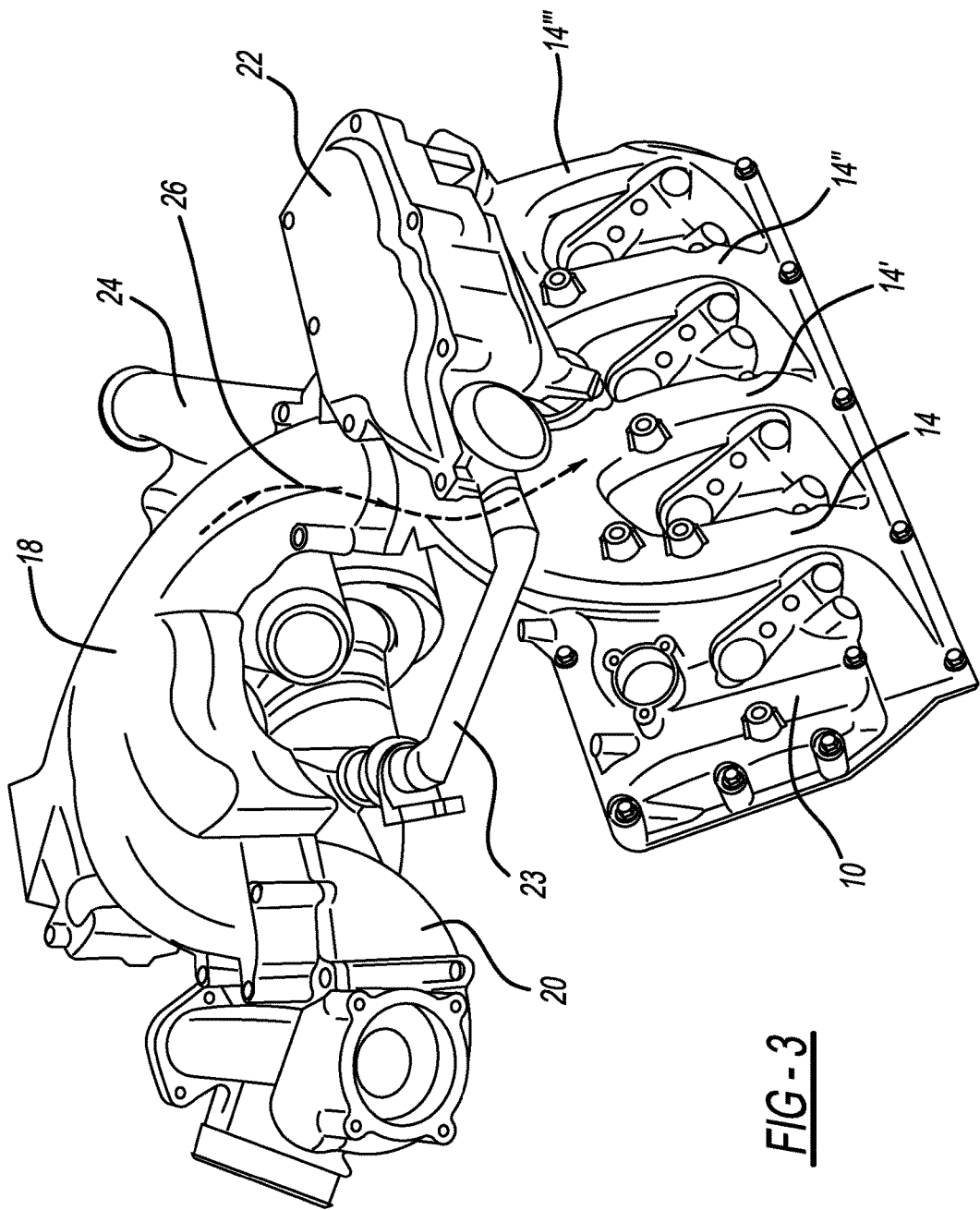
FIG. 3 is a perspective view of the system having an intake assembly and the rocker cover of FIGS. 1 and 2 with an associated closed crankcase ventilation oil separator assembly that incorporates an internal charge air feed through runners integrated in the rocker cover according to the disclosed inventive concept.

The rocker cover 10 is provided for use with an intake assembly and a closed crankcase ventilation oil separator assembly. This arrangement is illustrated in FIG. 3 in which a perspective view of the system of the disclosed inventive concept having an intake and rocker cover with an associated closed crankcase ventilation oil separator assembly that incorporates an internal charge air feed through runners integrated in the rocker cover according to the disclosed inventive concept is illustrated.

Particularly, an upper intake 18 and a lower intake 20 are illustrated. It is to be understood that reference to "upper" and "lower" when describing the upper intake 18 and the lower intake 20 is only made for the sake of convenience and is not intended as being limiting. Specifically, while conventionally intake manifolds in today's vehicles are generally positioned horizontally above the engine it is conceivable that the intake manifold according to the disclosed inventive concept may alternatively be vertically positioned to the side of the engine.

A cavity 16 is formed between the upper shell portion 12 and the lower shell portion 14. The intake manifold 10 also includes a throttle body mounting flange 18. A plurality of intake runners 20 are formed as part of the upper shell portion 12. It is to be understood that the overall configuration of the intake manifold as set forth in FIG. 1 is suggestive and is not intended as being limiting as other configurations may be possible without deviating from the spirit and scope of the disclosed inventive concept.

The upper intake 18 attaches to the intake port 12 of the rocker cover 12. Also attached to the rocker cover 12 is a closed crankcase ventilation oil separator assembly 22. The oil separator assembly 22 is attached to the lower intake 20 by an air return pipe 23. The oil separator assembly 22 is a unidirectional system that filters oil from vapors exiting the crankcase before they re-enter the lower intake 20 via air return pipe 23. A turbocharger assembly 24 is attached to the lower intake 20.

A stream of high pressure charge air is generated by the turbocharger assembly 24. The stream of high pressure charge air exits the upper intake 18 along flow direction 26 and is forced into the rocker cover intake runners 14, 14', 14" and 14'''. Some of the high pressure charge air is directed to the closed crankcase ventilation oil separator assembly 22 as is illustrated in FIG. 4, which is a sectional view of the oil separator assembly 22 and the rocker cover 10.

Figure 4:
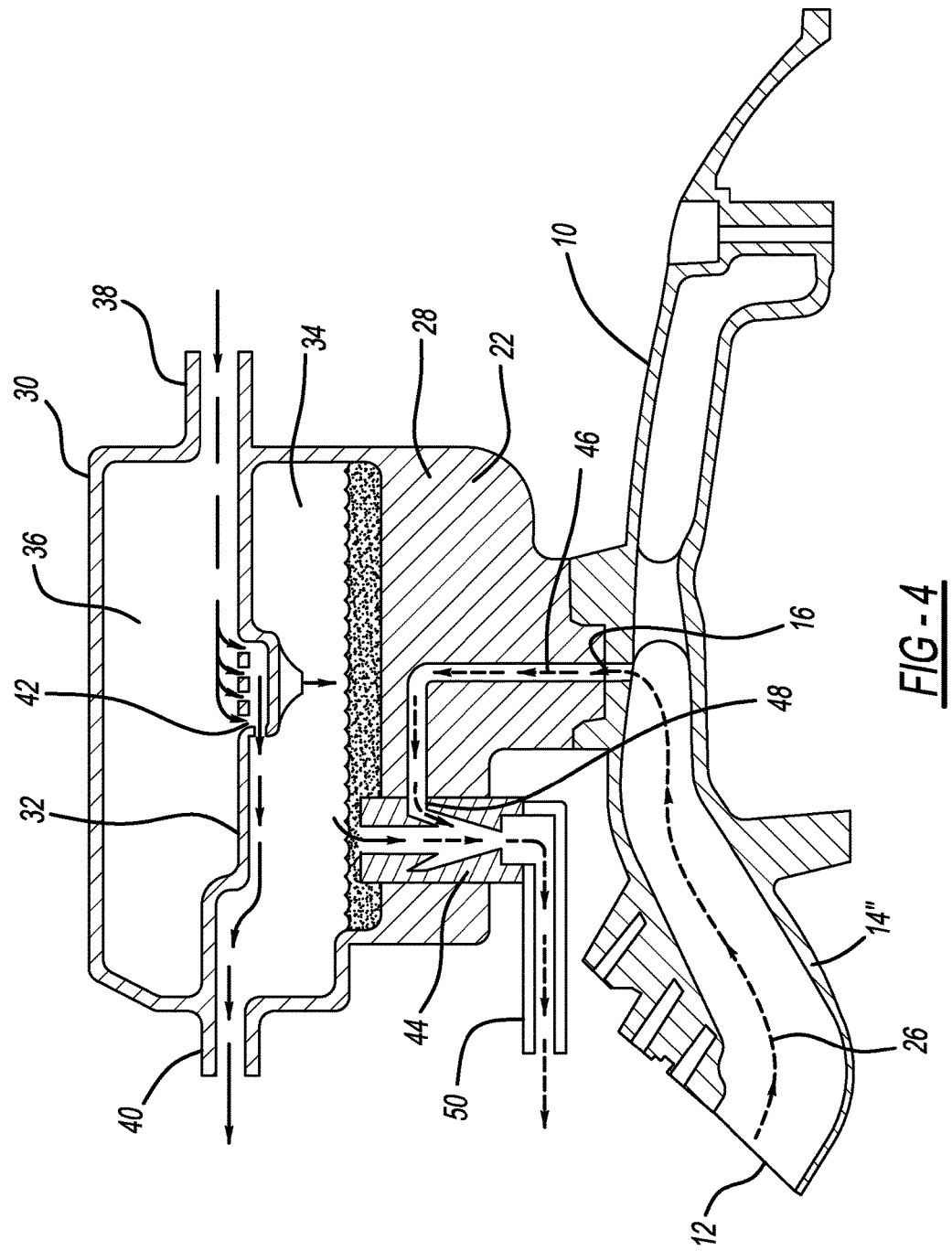
FIG. 4 is a sectional view of the oil separator assembly and rocker cover illustrating the air charge feed path according to the disclosed inventive concept.

Referring to FIG. 4, the closed crankcase ventilation oil separator assembly 22 includes an oil separator lower portion 28 and an oil separator upper portion 30. It is to be understood that reference to "upper" and "lower" when describing the lower oil separator lower portion 28 and the oil separator upper portion 30 is only made for the sake of convenience and is not intended as being limiting. A wall 32 is formed between the lower portion 28 and the upper portion 30. The wall 32 defines a lower oil separator plenum 34 and an upper oil separator plenum 36.

An oil and gasses mixture inlet 38 is formed in fluid association with the upper portion 30 of the oil separator assembly 22. The oil and gasses mixture inlet 38 is fluidly connected to the crankcase (not shown). An air outlet 40 is formed in fluid association with the lower portion 28 of the oil separator assembly 22. The air outlet 40 is attached to the lower intake 20 by the air return pipe 23 illustrated in FIG. 3.

Formed in the wall 32 is a diffuser 42 that receives the mixture of oil and gasses that enters the upper oil separator plenum 36. The diffuser 42 separates the gasses from the oil by known methods. The gasses are directed out of the lower oil separator plenum 34, through the air return pipe 23, and into the lower intake 20.

The rapid flow through or high velocity of the separated oil out of the oil separator assembly 22 is induced by an oil flow accelerator 44. The oil flow accelerator 44 may be of a variety of configurations, such as but not limited to a venturi pump or a jet pump. The speed of movement of the oil is dependent upon the input of high pressure air from an intake runner. Specifically, a high pressure path 46 is fluidly associated at its input end with an intake runner, such as intake runner 14". The high pressure path 46 is fluidly associated at its output end with a venturi inlet 48. Induced by the incoming high pressure air introduced into the oil flow accelerator 44 from the high pressure path 46, the flow of oil through the oil flow accelerator 44 is significantly increased, drawing pooled oil from the lower oil separator plenum 34 and out of the oil separator assembly 22 by way of an oil return outlet 50. The oil return outlet 50 is attached to the crankcase (not shown).

By introducing high pressure charge air feed into the oil separator, oil is forced from the oil separator outlet back to the engine crankcase. The arrangement described above and shown in the accompanying figures allows for the direct fitting of the oil separator to the rocker cover without the need for external plumbing such as a hose to connect these components. Such an arrangement allows for the use of a directly-attached, high efficiency oil separator to drain separated oil back to the crankcase while the engine is running.

The disclosed inventive concept as set forth above overcomes the challenges faced by known arrangements for separating gasses from oil. Accordingly, one skilled in the art will readily recognize from such discussion, and from the accompanying drawings and claims that various changes, modifications and variations can be made therein without departing from the true spirit and fair scope of the invention as defined by the following claims.

What is claimed is:

1. A high pressure charge air feed arrangement for an internal combustion engine comprising:
   a rocker cover having at least one intake runner formed within said rocker cover, said intake runner providing a first passageway for a stream of high pressure charge air;
   an oil separator having an oil and gas mixture inlet, an upper separator plenum, a lower separator plenum, a wall separating said separator plenums, said wall having an oil-separating diffuser formed therein, and an outlet in said lower separator plenum;
   an oil flow accelerator having an inlet end, an outlet end opposite said inlet end, and a side entrance formed between said inlet end and said outlet end, said inlet end being in fluid communication with said outlet of said lower separator plenum;
   a high pressure path providing a second passageway for the stream of high pressure charge air and formed within said oil separator, said second passageway having an input end and an output end, said input end directly connected to said first passageway and in fluid communication therewith, said output end directly connected to said side entrance of said oil flow accelerator and in fluid communication therewith; and
   an oil return outlet in fluid communication with said outlet end of said accelerator.

2. The high pressure charge air feed arrangement of claim 1, wherein said oil output side is fluidly associated with a crankcase oil return line.

3. The high pressure charge air feed arrangement of claim 1, wherein said oil flow accelerator is a venturi pump.

4. The high pressure charge air feed arrangement of claim 1, wherein said oil flow accelerator is a jet pump.

5. An engine system comprising:
   a rocker cover;
   an intake port integrated into said rocker cover;
   an intake runner formed within said rocker cover and communicatively coupled to said intake port;
   a gas and oil separator fixed to said rocker cover, said separator having an upper separator plenum, a lower separator plenum, and a gas and oil diffuser fitted therebetween, said lower separator plenum having an oil outlet;
   an oil flow accelerator communicatively coupled to said gas and oil separator, said accelerator having an oil inlet in fluid communication with said oil outlet of said lower separator plenum, said accelerator further including an oil outlet, said accelerator being at least partially fitted within said lower separator plenum; and
   a high pressure path formed through said lower separator plenum between said intake runner and said oil accelerator, said high pressure path providing a passageway having an input end and an output end, said input end directly connected to and in fluid communication with said intake runner, said output end directly connected to and in fluid communication with said accelerator.

6. The engine system of claim 5, wherein said oil flow accelerator is a venturi pump.

7. The engine system of claim 5, wherein said oil flow accelerator is a jet pump.

8. A system for separating crankcase oil and gases in an internal combustion engine comprising:
   a rocker cover having an intake runner formed therein, said intake runner having an input end and an output end;
   an air intake fluidly connected to said input end of said intake runner;
   a gas and oil separator including an upper separator plenum, a lower separator plenum, a wall dividing said separator plenums, and an oil and gas diffuser fitted in said wall to define an opening between said upper and lower separator plenums, said upper separator plenum including an oil and gas mixture inlet and said lower separator plenum including an air outlet and an oil outlet;
   an oil flow venturi having an inlet end and an outlet end, said inlet end of said oil flow venturi fluidly attached to said oil outlet of said lower separator plenum;
   a high pressure path providing a passageway having an input end and an output end, said input end of said passageway directly connected to and in fluid communication with said intake runner, said output end of said passageway directly connected to and in fluid communication with said oil flow venturi between said inlet end and said outlet end thereof.

* * * * *